(12) United States Patent
Lee et al.

(10) Patent No.: US 9,126,068 B2
(45) Date of Patent: Sep. 8, 2015

(54) METHOD OF TREATING STRONG BASIC ALUMINUM PRODUCTION WASTE

(71) Applicant: KOREA INSTITUTE OF GEOSCIENCE AND MINERAL RESOURCES, Daejeon (KR)

(72) Inventors: Pyeong-Koo Lee, Daejeon (KR); Sang-Woo Ji, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 14/169,918

(22) Filed: Jan. 31, 2014

(65) Prior Publication Data
US 2014/0217323 A1 Aug. 7, 2014

(30) Foreign Application Priority Data

Feb. 6, 2013 (KR) ........................ 10-2013-0013470

(51) Int. Cl.
*A62D 3/36* (2007.01)
*B09B 3/00* (2006.01)

(52) U.S. Cl.
CPC ................ *A62D 3/36* (2013.01); *B09B 3/0041* (2013.01)

(58) Field of Classification Search
CPC ........................................ A62D 3/36
USPC ........................................ 588/318
See application file for complete search history.

(56) References Cited

U.S. PATENT DOCUMENTS

2006/0144797 A1* 7/2006 McConchie et al. .......... 210/724
2012/0313038 A1* 12/2012 Laros et al. ................... 252/194

FOREIGN PATENT DOCUMENTS

| KR | 2002-0085638 | 11/2002 |
| KR | 10-2004-0064242 | 7/2004 |
| KR | 10-0898272 | 5/2009 |
| KR | 10-2012-0108149 | 10/2012 |

* cited by examiner

*Primary Examiner* — Edward Johnson
(74) *Attorney, Agent, or Firm* — Christie, Parker & Hale, LLP

(57) ABSTRACT

Embodiments of the present invention relate to a method of treating a strong basic aluminum production waste. The method includes preparing an aluminum production waste; and mixing the aluminum production waste with gypsum.

4 Claims, 3 Drawing Sheets

METHOD OF TREATING STRONG BASIC ALUMINUM PRODUCTION WASTE

CROSS-REFERENCE TO RELATED APPLICATION

This application claims priority to Korean Patent Application No. 10-2013-0013470 filed on Feb. 6, 2013, and all the benefits accruing therefrom under 35 U.S.C. §119, the contents of which is incorporated by reference in its entirety.

BACKGROUND OF THE INVENTION

1) Field of the Invention

The present invention relates to a method of treating a strong basic aluminum waste.

2) Background of Related Art

In general, red mud, which is a by-product produced in the mineral dressing process of producing alumina by adding caustic soda to raw bauxite ore, is a gel residue which is a strong alkaline mineral waste having pH 11 or more.

Since the waste in an original state has a bad effect on a surrounding ecosystem, the waste has been treated in such a manner that the waste is just buried in a waste landfill or buried after chemically treated or is dumped into the coast sea. However, the waste causes pollution to natural environment for a long time, such as soil pollution, groundwater pollution, marine pollution and natural ecosystem destruction when compared with neutral material of pH 7.0 which is generally adaptive to natural environment, so the ocean disposal has been prohibited by London convention, so that there has been great difficulty in disposal of the waste.

Thus, although various studies for treating the waste have been performed, the studies have not yet suggested the solution for preventing environment pollution There is a related art for the present invention, such as Korean Unexamined Patent Publication No. 2012-0108149 (published on Oct. 5, 2012) entitled "Filter medium and method of preparing the same from recycled aluminum oxide".

SUMMARY OF THE INVENTION

Therefore, an object of the present invention is provided to a method of simply and economically treating strong basic aluminum production waste by using gypsum.

The present invention suggests several objects without limitation to the above objects, and other objects, which are not described, can be clearly comprehended from the following description by those skilled in the art.

To achieve the above-described object, according to an embodiment of the present invention, there is provided a method of treating a strong basic aluminum production waste. The method includes preparing an aluminum production waste; and mixing the aluminum production waste with gypsum.

The preparing of the aluminum production waste may include a crushing and pulverizing process.

The aluminum production waste may include red mud.

The aluminum production waste may have a size in a range of 0.1 μm to 2 mm.

The gypsum may include desulfurized gypsum or phosphor-gypsum.

The gypsum may be included in the aluminum production waste at a content of 10 weight % to 80 weight % based on the aluminum production waste.

In addition, according to another embodiment of the present invention, there is provided a method of treating a strong basic aluminum production waste. The method includes crushing and pulverizing an aluminum production waste; and mixing the crushed and pulverized aluminum production waste with gypsum at a content of 10 weight % to 80 weight % based on the aluminum production waste.

According to still another embodiment of the present invention, there is provided an aluminum production waste treated according to a method of treating a strong basic aluminum production waste, where the aluminum production waste has a pH in a range of 6.90 to 9.10.

According to the present invention, the strong basic waste generated when producing aluminum can be neutralized in a simple scheme by using natural gypsum of which the deposit is rich and the cost is inexpensive or by using desulfurized gypsum and phosphor-gypsum produced in a thermoelectric power plant and a fertilizer manufacturing plant.

In addition, the present invention is economical since the strong basic aluminum production waste which may cause environment pollution is treated by using gypsum. According to the present invention, an environment pollution material such as a waste can be removed. In addition, the present invention may be utilized for construction and construction materials.

DETAILED DESCRIPTION OF THE INVENTION

Hereinafter, a preferable embodiment according to the present invention will be described with reference to accompanying drawings in detail.

The advantages, the features, and schemes of achieving the advantages and features of the present invention will be apparently comprehended by those skilled in the art based on the embodiments, which are detailed later in detail, together with accompanying drawings.

The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims In addition, the detailed descriptions of well-known techniques incorporated herein may be omitted when they make the subject matter rather unclear.

The present invention provides a method of treating a strong basic aluminum production waste which includes the steps of: preparing an aluminum production waste; and mixing the aluminum production waste with gypsum.

The strong basic aluminum production waste described in the present invention refers to a waste produced after smelting and refining raw bauxite ore in an electrolysis scheme to obtain aluminum. Conventionally, such a waste may be red mud. In case that the waste is red mud, the waste has been dumped into the sea until now. However, ecosystem disturbance due to strong alkalization and accumulation of heavy metal in a living organism due to red mud components has been caused in the area of sea into which the red mud is dumped, so that the aluminum production waste had been designated as a waste prohibited from being dumped in the sea.

Thus, the present invention provides a method of treating the strong basic aluminum production waste to the level adapted for the environment by using natural gypsum of which the deposit is rich and the cost is inexpensive or the desulfurized gypsum and phosphor-gypsum produced in a thermoelectric power plant and a fertilizer manufacturing plant.

Figure 1:
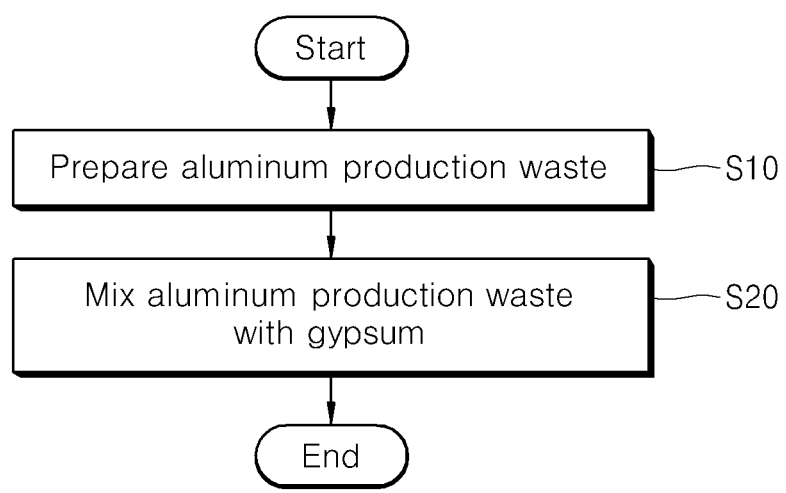
FIG. 1 is a flowchart illustrating a method of treating a strong basic aluminum production waste according to an embodiment of the present invention.

FIG. 1 is a flowchart illustrating a method of treating a strong basic aluminum production waste according to an embodiment of the present invention. Hereinafter, the present invention will be described in detail with reference to FIG. 1.

(1) Step S10 of Preparing Aluminum Production Waste

The method of treating a strong basic aluminum production waste according to the present invention includes step S10 of preparing an aluminum production waste.

The step of preparing an aluminum production waste may include a crushing and pulverizing process for the purpose of the effective and smooth reaction with gypsum in a next process.

The aluminum production waste may have a size in a range of 0.1 μm to 2 mm. Although, even when the size of the aluminum production waste is less than 0.1 μm, the aluminum production waste is usable, it may be ineffective to use the aluminum production waste having a size less than 0.1 μm since a time period of the crushing and pulverizing process is lengthened and the cost is increased. When the size of the aluminum production waste exceeds 2 mm, the aluminum production waste is not smooth in the reaction with the gypsum, so that the aluminum production waste may not be neutralized.

(2) Step S20 of Mixing Aluminum Production Waste with Gypsum

The method of treating a strong basic aluminum production waste according to the present invention includes step S20 of mixing an aluminum production waste with gypsum.

In a broad sense, the gypsum is the generic term of minerals having the compositional formula of $CaSO_4$. The gypsum may be classified into dehydrate gypsum (crystal gypsum: $CaSO_4 \cdot 2H_2O$), hemihydrate gypsum (calcined gypsum: $CaSO_4 \cdot \frac{1}{2}H_2O$) and anhydrous gypsum (anhydrite: $CaSO_4$) according to water of crystallization or may be classified into natural gypsum and chemical gypsum according to the creation process thereof. However, in the present invention, the gypsum may be desulfurized gypsum produced in a thermoelectric power plant or phosphor-gypsum produced in a fertilizer manufacturing plant.

In this case, the gypsum may be included in the aluminum production waste at a content of 10 weight % to 80 weight % based on the aluminum production waste. When the content of the gypsum is less than 10 weight %, the content of the gypsum may be too small to neutralize the aluminum production waste. When the content of the gypsum is more than 80 weight %, the gypsum is excessively included so that the reaction of the gypsum with the aluminum production waste may be deteriorated, lowering the cost efficiency of the process.

Further, the present invention provides a method of treating a strong basic aluminum production waste which includes the steps of: crushing and pulverizing an aluminum production waste; and mixing the crushed and pulverized aluminum production waste with gypsum at a content of 10 weight % to 80 weight % based on the aluminum production waste.

The detailed description about the steps is as described above.

In addition, the present invention provides the aluminum production waste having a pH in the range of 6.90 to 9.10 which is treated according to the method of treating a strong basic aluminum production waste which includes the step of preparing an aluminum production waste; and the step of mixing the aluminum production waste with gypsum.

According the present invention, the aluminum production waste is mixed with the gypsum, so that the pH of the strong basic aluminum production waste may be reduced at a pH in the range of 6.90 to 9.10. Thus, the aluminum production waste may be buried and dumped into the sea and may be used for construction or as a portion of a construction material.

Embodiment 1: Treating of Strong Basic Aluminum Production Waste

After crushing and pulverizing 4.5 g of the aluminum production waste into the size of 2 mm or less, the aluminum production waste was mixed with 0.5 g of the desulfurized gypsum to treat the strong basic aluminum production waste.

Embodiment 2: Treating of Strong Basic Aluminum Production Waste

After crushing and pulverizing 4 g of the aluminum production waste into the size of 2 mm or less, the aluminum production waste was mixed with 1 g of the desulfurized gypsum to treat the strong basic aluminum production waste.

Embodiment 3: Treating of Strong Basic Aluminum Production Waste

After crushing and pulverizing 3 g of the aluminum production waste into the size of 2 mm or less, the aluminum production waste was mixed with 2 g of the desulfurized gypsum to treat the strong basic aluminum production waste.

Embodiment 4: Treating of Strong Basic Aluminum Production Waste

After crushing and pulverizing 2 g of the aluminum production waste into the size of 2 mm or less, the aluminum production waste was mixed with 3 g of the desulfurized gypsum to treat the strong basic aluminum production waste.

Embodiment 5: Treating of Strong Basic Aluminum Production Waste

After crushing and pulverizing 1 g of the aluminum production waste into the size of 2 mm or less, the aluminum production waste was mixed with 4 g of the desulfurized gypsum to treat the strong basic aluminum production waste.

Embodiment 6: Treating of Strong Basic Aluminum Production Waste

After crushing and pulverizing 4.5 g of the aluminum production waste into the size of 2 mm or less, the aluminum production waste was mixed with 0.5 g of the phosphor-gypsum to treat the strong basic aluminum production waste.

Embodiment 7: Treating of Strong Basic Aluminum Production Waste

After crushing and pulverizing 4 g of the aluminum production waste into the size of 2 mm or less, the aluminum production waste was mixed with 1 g of the phosphor-gypsum to treat the strong basic aluminum production waste.

Embodiment 8: Treating of Strong Basic Aluminum Production Waste

After crushing and pulverizing 3 g of the aluminum production waste into the size of 2 mm or less, the aluminum production waste was mixed with 2 g of the phosphor-gypsum to treat the strong basic aluminum production waste.

Embodiment 9: Treating of Strong Basic Aluminum Production Waste

After crushing and pulverizing 2 g of the aluminum production waste into the size of 2 mm or less, the aluminum production waste was mixed with 3 g of the phosphor-gypsum to treat the strong basic aluminum production waste.

Embodiment 10: Treating of Strong Basic Aluminum Production Waste

After crushing and pulverizing 1 g of the aluminum production waste into the size of 2 mm or less, the aluminum production waste was mixed with 4 g of the phosphor-gypsum to treat the strong basic aluminum production waste.

COMPARISON EXAMPLE 1

5 g of the strong basic aluminum production waste was prepared.

COMPARISON EXAMPLE 2

5 g of the desulfurized gypsum was prepared.

COMPARISON EXAMPLE 3

5 g of the phosphor-gypsum was prepared.

The following Table 1 shows the amounts of strong basic aluminum production waste and gypsum in the embodiments 1 to 10 and the comparison examples 1 to 3.

TABLE 1

| Example | Amount of waste (g) | Amount of desulfurized gypsum (g) | Amount of phosphor-gypsum (g) |
| --- | --- | --- | --- |
| Embodiment 1 | 4.5 | 0.5 | — |
| Embodiment 2 | 4 | 1 | — |
| Embodiment 3 | 3 | 2 | — |
| Embodiment 4 | 2 | 3 | — |
| Embodiment 5 | 1 | 4 | — |
| Embodiment 6 | 4.5 | — | 0.5 |
| Embodiment 7 | 4 | — | 1 |
| Embodiment 8 | 3 | — | 2 |
| Embodiment 9 | 2 | — | 3 |
| Embodiment 10 | 1 | — | 4 |
| Comparison example 1 | 5 | — | — |
| Comparison example 2 | — | 5 | — |
| Comparison example 3 | — | — | 5 |

EXAMPLE OF EXPERIMENT 1

Measuring pH of Aluminum Production Waste

Figure 2:
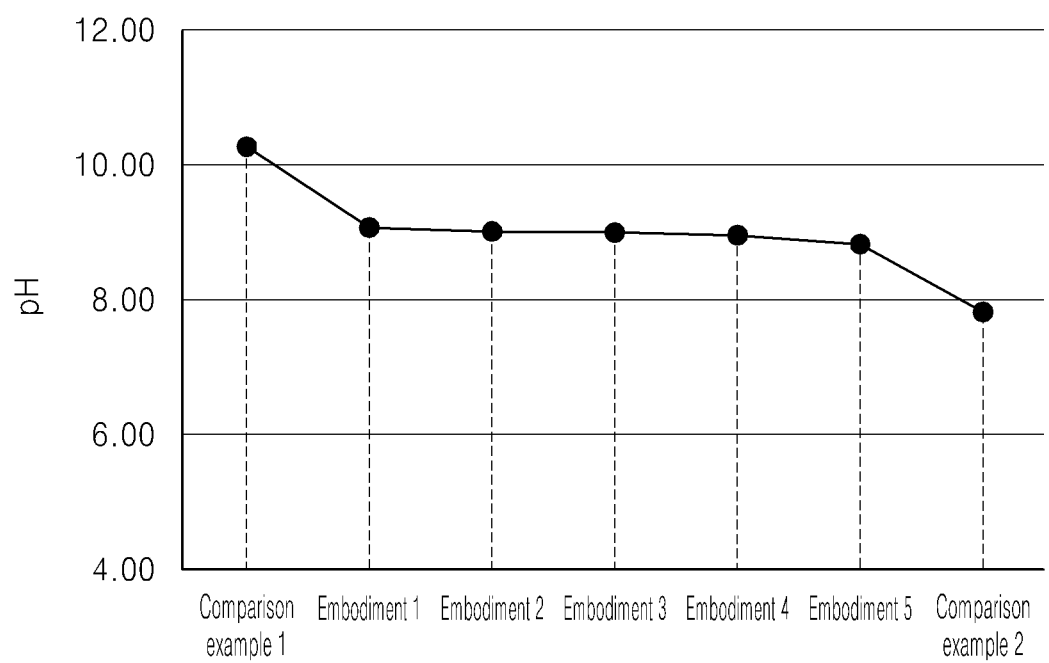
FIG. 2 is a graph showing the results of measuring pH of the embodiments 1 to 5 according to the method of treating a strong basic aluminum production waste of the present invention.
Figure 3:
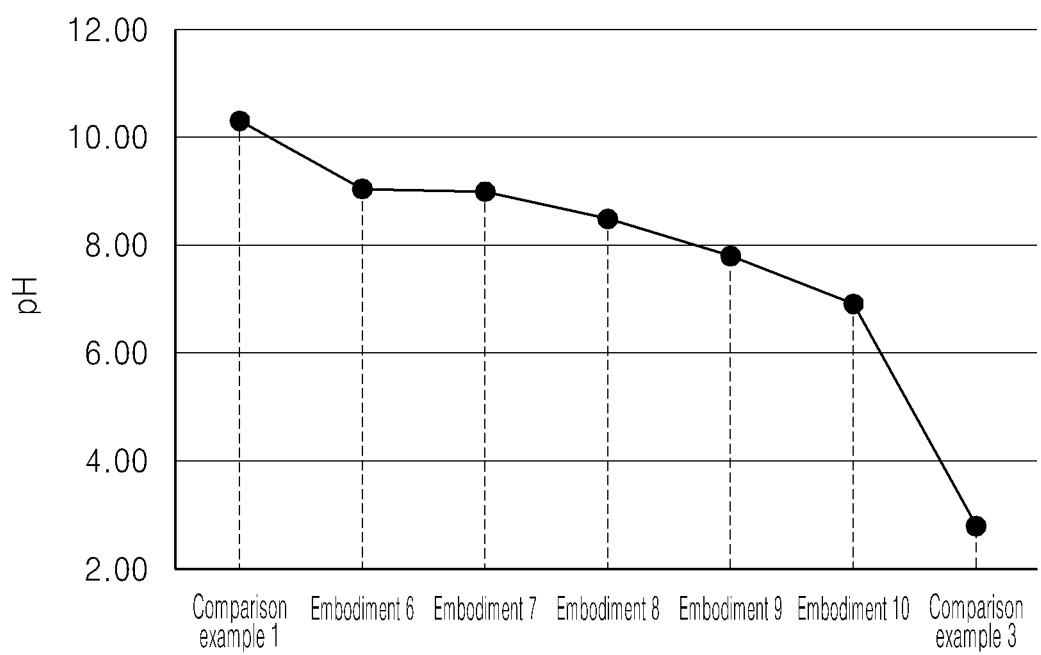
FIG. 3 is a graph showing the results of measuring pH of the embodiments 6 to 10 according to the method of treating a strong basic aluminum production waste of the present invention.

In order to measure pH in the embodiments 1 to 10 and the comparison examples 1 to 3 according to the method of treating a strong basic aluminum production waste of the present invention, the following experiment was performed and the experiment results were denoted in Table 2 and FIGS. 2 and 3.

Measurement of pH

After mixing materials of the embodiments 1 to 10 and the comparison examples 1 to 3 with distilled water, respectively, the mixtures were shaken in a shaker for one hour. The shaking had been performed at the room temperature and normal pressure, and the number of shaking was 30 times/minute and the amplitude of the shaking was set as 4 to 5 cm. After the shaking, the pH of the embodiments 1 to 10 and the comparison examples 1 to 3 were measured.

TABLE 2

| Example | Amount of waste (g) | Amount of desulfurized gypsum (g) | Amount of phosphor-gypsum (g) | pH |
| --- | --- | --- | --- | --- |
| Embodiment 1 | 4.5 | 0.5 | — | 9.07 |
| Embodiment 2 | 4 | 1 | — | 9.02 |
| Embodiment 3 | 3 | 2 | — | 8.99 |
| Embodiment 4 | 2 | 3 | — | 8.95 |
| Embodiment 5 | 1 | 4 | — | 8.81 |
| Embodiment 6 | 4.5 | — | 0.5 | 9.08 |
| Embodiment 7 | 4 | — | 1 | 9.01 |
| Embodiment 8 | 3 | — | 2 | 8.48 |
| Embodiment 9 | 2 | — | 3 | 7.82 |
| Embodiment 10 | 1 | — | 4 | 6.93 |
| Comparison example 1 | 5 | — | — | 10.29 |
| Comparison example 2 | — | 5 | — | 7.82 |
| Comparison example 3 | — | — | 5 | 2.84 |

As shown in Table 2, when only the strong basic existed (Comparison example 1), the pH was 10.29. When only the desulfurized gypsum existed (Comparison example 2), the pH was 7.82. When only the phosphor-gypsum existed (Comparison example 3), the pH was 2.84.

In addition, as shown in Table 2 and FIG. 2, the pH of the embodiments 1 to 5 (mixing with desulfurized gypsum) were in the range of 8.81 to 9.07. Specifically, as shown in Table 2 and FIG. 3, in the embodiments 6 to 10 (mixing with phosphor-gypsum), the pH were in the range of 6.93 to 9.08. In more detail, when 0.5 g of the phosphor-gypsum and g of the desulfurized gypsum were used, the pH of the aluminum production wastes were represented as 9.08 and 9.07, and 9.01 and 9.02, respectively, which substantially approximate to each other. However, when 2 g of the phosphor-gypsum was used, the pH was represented as 8.48. Thus, it was known that the pH obtained by using the phosphor-gypsum is lower than the pH obtained by using the desulfurized gypsum, that is, pH 8.99. It was known that the pH obtained by using the phosphor-gypsum is remarkably lower than the pH obtained by using the desulfurized gypsum because the pH were represented as 7.82 and 6.93 when using the phosphor-gypsum and the pH were represented as 8.95 and 8.81 when using the desulfurized gypsum. It was known that the pH was lowered when the desulfurized gypsum was used, and the pH can be more lowered approximate to the pH of 7, which is the buryable range, when using the phosphor-gypsum.

Therefore, it had been ascertained that, as the amount of gypsum in the waste treated by the method of treating a strong basic aluminum production waste according to the present invention is increased, the pH is gradually decreased.

Until now, the method of treating strong basic aluminum production waste according to the embodiment of the present invention has been described in detail, it is obvious that various modifications may be made by those skilled in the art without departing from the scope of the present invention.

As described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects.

Therefore, it should be understood that the present invention is not limited to the embodiments described above. The scope of the present invention will be limited by the appended claims. In addition, it will also be apparent to those skilled in the art that variations or modifications from the appended claims and the equivalent concept of the claims are included in the scope of the present invention.

What is claimed is:

1. A method of treating a strong basic aluminum production waste, the method comprising:
   preparing an aluminum production waste; and
   mixing the aluminum production waste with phosphorgypsum at a content of 60 weight % to 80 weight % based on the aluminum production waste,
   wherein the aluminum production waste has a pH in a range of 6.93 to 7.82.

2. The method of claim 1, wherein the preparing of the aluminum production waste includes a crushing and pulverizing process.

3. The method of claim 1, wherein the aluminum production waste includes red mud.

4. The method of claim 1, wherein the aluminum production waste has a size in a range of 0.1 μm to 2 mm.

* * * * *